United States Patent Office 3,532,217
Patented Oct. 6, 1970

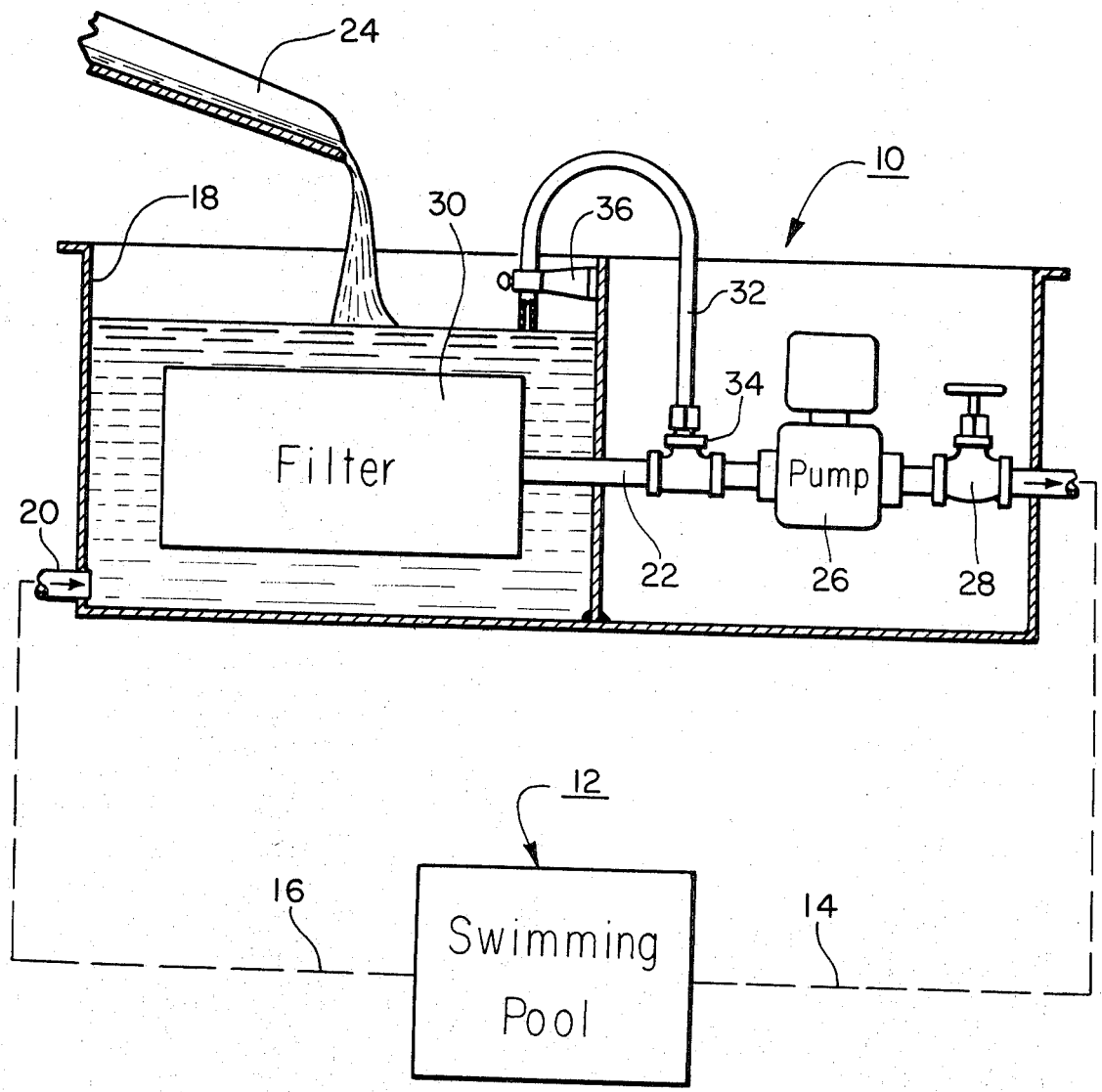

3,532,217
LIQUID LEVEL CONTROL SYSTEM
George B. Richards, 1212 Ranch Road,
Lake Forest, Ill. 60045
Filed Apr. 9, 1969, Ser. No. 814,644
Int. Cl. E04h 3/16
U.S. Cl. 210—169                                    5 Claims

ABSTRACT OF THE DISCLOSURE

A swimming pool filtration system includes a wet tank having a filter disposed therein. The circulating water enters the wet tank from the pool drain and is drawn from the tank after passing through the filter by a pump having its suction inlet coupled to the tank outlet. In order to preclude overflow of the wet tank or, alternatively, an undesirable exposure of the filter to the atmosphere, a liquid level or flow rate control is provided. Specifically, one end of a hollow conduit is coupled intermediate the pump suction inlet and tank outlet while its opposite end is disposed at a desired liquid maintenance level in the wet tank. Thus whenever the tank water level recedes below the desired level as occurs when the pump is operating at normal pumping efficiency, air is communicated to the pump suction inlet thereby reducing the effective pumping rate of the pump below the normal inlet flow rate from the pool drains. Other applications and features are disclosed.

INTRODUCTION

The present invention relates to a liquid level or flow rate control system and, more particularly, is directed to a system for maintaining a constant liquid level within a reservoir having an inlet and an exit flow. For convenience and clarity of explanation, the invention is described in the context of a swimming pool filtration system although the more general utility of the invention will be recognized by those skilled in the art.

SUMMARY OF THE INVENTION

The invention is directed to a liquid level or flow rate control system comprising a first liquid receiving reservoir having an inlet and an outlet. Fluid flow means are connected to the reservoir inlet for introducing liquid therein while a pump having a predetermined nominal pumping rate is disposed with its suction side or inlet coupled to the reservoir outlet. A hollow conduit means is provided having one end coupled intermediate the pump inlet and the reservoir outlet and its opposite end disposed at a desired liquid maintenance level in the reservoir. In operation, air is communicated to the pump inlet whenever the reservoir liquid level recedes below the desired level thereby reducing the pump suction and thus the effective liquid pumping rate; the pump continues operating at a reduced efficiency until the now greater flow into the tank causes the liquid to again rise and cover the open end of the conduit.

The liquid level control arrangement of the invention is of particular utility in swimming pool filtration systems. Specifically, in such environments, a diatomaceous earth filter is disposed within a wet tank or reservoir; a pump communicates with the tank so that water is drawn by the pump suction through the filter on its passage out of the tank. In order to preclude filter damage as by slacking or flaking of the filter media from its support, it is important that a pump suction be maintained on the filter at all times. The level control arrangement of the present invention provides a structurally simple and economical arrangement for maintaining a desired liquid level within the wet tank consistent with the foregoing requirement.

BRIEF DESCRIPTION OF THE DRAWINGS

The novel features of the present invention are set forth with particularity in the appended claims. The invention together with further objects and advantages thereof may best be understood, however, by reference to the following description taken in conjunction with the accompanying drawing, the single figure of which illustrates a preferred embodiment of the liquid level or flow rate control system of the invention.

DESCRIPTION OF THE PREFERRED EMBODIMENT

Referring now to the drawing, there is denoted generally by the reference numeral 10 a swimming pool filtration system embodying the liquid level or flow rate control arrangement of the present invention. A swimming pool 12 as well as its inlet and drain connections 14 and 16 are illustrated only schematically in the drawing as their particular construction forms no part of the present invention.

Basically, the filtration system 10 is conventional comprising a first reservoir or wet tank 18 having an inlet 20 and an outlet conduit 22. Water is introduced into the wet tank 18 by fluid flow means comprising the main pool drain 16 which is connected to the tank inlet 20 and a pool overflow scupper which discharges into the open top of the wet tank 18, as depicted schematically in the drawing.

The inlet or suction side of a pump 26 is coupled to the outlet conduit 22 of the tank 18 while the outlet or discharge side of the pump 26 communicates with the pool inlet 14 through a conventional gate valve 28. The water returning to the pool 12 is filtered within wet tank 18. Specifically, a filter means denoted schematically by the reference numeral 30 is disposed within the tank 18 at a position lying entirely below the desired water maintenance level in the tank. The filter 30 may be of any conventional type and in the present embodiment constitutes a diatomaceous earth filter media supported on a cylinder frame with the outlet conduit 22 of the tank communicating to the closed interior of the filter cylinder 30. The filter 30 is of a character such that a pump suction must be maintained at all times to avoid slacking or flaking of the filter media from its cylindrical support; it is also important to avoid exposure of the filter to the atmosphere as it is damaged by a resultant crumbling of the diatomaceous earth filter media from its cylindrical support.

As shown in the drawings, the outlet conduit 22 and the pump 26 (as well as the filter 30) lie entirely below the plane defining the desired liquid maintenance level in the reservoir. Thus, there is always a tendency for the liquid in the reservoir to flow by gravity to the inlet of the pump 26; this is critical to operation of the system as will be explained hereinafter.

In order to sense and control the water level within the wet tank 18, there is provided in accordance with the invention a hollow conduit 32 having one end coupled intermediate the wet tank outlet 22 and the inlet or suction side of the pump 26, the coupling in the present instance being made by a conventional T-joint fitting 34. The opposite end of the conduit 32 is disposed within the wet tank 18 at a position corresponding to the desired water level therein and is there retained by an adjustable clamp 36 mounted to the interior wall of the tank 18. The conduit 32 may be a conventional flexible hose or the like with an effective internal diameter being selected according to pump size and other factors, as will presently be recognized by those skilled in the art.

In explaining operation of the level or flow control arrangement of the invention, it is assumed that the swimming pool 12 is filled to its normal capacity and that the water in the wet tank 18 is at the desired level as indicated in the drawing. Under these quiescent conditions, the gate valve 28 is adjusted to provide a water flow rate to the pool inlet 14 which is somewhat greater than the normal flow rate from the main pool drain 16 and scupper 24 into the tank 18.

Thus, the water level within the tank 18 gradually recedes to expose the opening end of the conduit 32 thereby allowing the atmosphere to communicate with the inlet or suction side of the pump 26. The resultant reduction in pump suction causes a corresponding reduction in the pumping rate of the pump 26 to a value less than the flow rate into the tank 18 from the pool drain 16 and scupper 24. This condition prevails until the water level in the wet tank 18 again rises sufficiently to cover the open end of the conduit 32 at which time the normal or nominal pumping rate of the pump 26 is restored.

By way of example, in one preferred embodiment of the invention, a pump of the centrifugal self-priming type and having a nominal pumping rate of 75 gallons per minute was employed. Exposure of the open end of the hollow conduit 32 to the atmosphere caused a reduction in pumping rate to approximately 20 gallons per minute which, of course, was sustained until the water level within the tank again rose to cover the open end of the conduit. It has been found that the reduction in pumping rate is dependent upon the effective diameter of the conduit which may be varied by use of a nozzle (not shown) or the like The fact, as previously stated, that there is always a tendency for liquid to flow by gravity to the inlet of the pump, i.e. there is a static head of liquid applied to the pump inlet, assures that the pump prime is maintained despite opening of the conduit 32; accordingly, with the conduit 32 open to the atmosphere the pump 26 continues to pump liquid although its efficiency is markedly reduced, as noted in the above example.

In selecting a minimal flow rate, it is important in the present environment to maintain an adequate pump suction such that slacking or loosening of the filter cake does not occur. It is also important in all environments to select an adequate minimum flow rate such that adequate pump cooling and/or pump seal lubrication is provided.

While a particular embodiment of the present invention has been shown and described, it is apparent that various changes and modifications may be made and, in particular, it will be recognized by those skilled in the art that the liquid level control arrangement of the invention has application in various environments other than that here described.

I claim:
1. A liquid level control system comprising:
   a first liquid receiving reservoir having an inlet for permitting flow of liquid into said reservoir and having an outlet located below a predetermined plane which defines a desired liquid maintenance level in said reservoir;
   fluid flow means adapted for introducing liquid into said reservoir at said inlet;
   pump means having a predetermined nominal pumping rate and having an inlet developing a predetermined pump suction and an outlet for discharging said liquid;
   conduit means coupling said first reservoir outlet to said pump means inlet, said conduit means and said pump means being located entirely below the level of said predetermined plane for providing a continuous gravity flow of liquid from said reservoir to said pump inlet; and
   hollow conduit means having one end coupled intermediate said pump inlet and said first reservoir outlet and an opposite end disposed in said predetermined plane for communicating air to said pump inlet in partial satisfaction of said pump suction when the reservoir liquid level recedes below said desired level to reduce the effective liquid pumping rate of said pump means to a second predetermined rate.

2. The liquid level control system of claim 1 and including a second liquid receiving reservoir coupled in a recirculation flow path between said pump outlet and said first receiving reservoir inlet with the flow rate from said second to said first reservoir being at least partially independent of the pumping rate of said pump and being of a first predetermined nominal value, and a gate valve in said flow path for adjustably setting the nominal pumping rate of said pump to a value slightly greater than said first predetermined nominal value.

3. The liquid level control system of claim 1 in which said pump develops a predetermined suction at said pump inlet to said predetermined nominal pumping rate and in which said hollow conduit means is of an effective internal diameter for providing an air flow to said pump inlet adequate to substantially reduce said pump suction and thus said pumping rate when said reservoir liquid level recedes below said predetermined level.

4. The liquid level control system of claim 3 and including filter means, positioned below said desired liquid maintenance level within said first reservoir, comprising a diatomaceous earth layer disposed on a hollow cylindrical frame with the interior of said frame communicating with said pump inlet, said effective internal diameter of said hollow conduit means being sufficiently small that said reduced pump suction and said reduced pumping rate are adequate to preclude slacking of said filter cake from said frame respectively and to provide sufficient liquid flow through said pump to avoid pump damage from overheating.

5. The liquid level control system of claim 4 in which said pump is of a centrifugal self-priming type and in which said first and second reservoirs are respectively a swimming pool and a water filter tank.

References Cited
UNITED STATES PATENTS

| 2,739,939 | 3/1956 | Leslie | 210—169 X |
| 3,184,111 | 5/1965 | Watson et al. | 210—169 X |
| 3,303,819 | 2/1967 | Wade | 119—5 |

REUBEN FRIEDMAN, Primary Examiner

T. A. GRANGER, Assistant Examiner

U.S. Cl. X.R.,

137—565, 599